US009822198B2

(12) United States Patent
Vallieri et al.

(10) Patent No.: US 9,822,198 B2
(45) Date of Patent: Nov. 21, 2017

(54) PROCESS FOR THE PREPARATION OF BRANCHED POLYBUTADIENE HAVING A HIGH CONTENT OF 1,4-CIS UNITS

(71) Applicant: VERSALIS S.P.A., San Donato Milanese (IT)

(72) Inventors: Andrea Vallieri, Bologna (IT); Marianna Zinna, Ravenna (IT); Costantino Perretta, Ferrara (IT)

(73) Assignee: Versalis S.p.A., San Donato Milanese (IT)

( * ) Notice: Subject to any disclaimer, the term of this patent is extended or adjusted under 35 U.S.C. 154(b) by 37 days.

(21) Appl. No.: 14/388,474

(22) PCT Filed: Apr. 24, 2013

(86) PCT No.: PCT/IB2013/053230
§ 371 (c)(1),
(2) Date: Sep. 26, 2014

(87) PCT Pub. No.: WO2013/168039
PCT Pub. Date: Nov. 14, 2013

(65) Prior Publication Data
US 2015/0080526 A1 Mar. 19, 2015

(30) Foreign Application Priority Data
May 11, 2012 (IT) .............................. MI2012A0808

(51) Int. Cl.
*C08F 136/06* (2006.01)
*B60C 1/00* (2006.01)
*C08F 36/06* (2006.01)
*C08K 3/04* (2006.01)
*C08K 3/36* (2006.01)

(52) U.S. Cl.
CPC .............. *C08F 136/06* (2013.01); *B60C 1/00* (2013.01); *C08F 36/06* (2013.01); *C08K 3/04* (2013.01); *C08K 3/36* (2013.01)

(58) Field of Classification Search
CPC ......... C08F 136/06; C08F 36/06; C08F 4/545
See application file for complete search history.

(56) References Cited

U.S. PATENT DOCUMENTS

| 6,437,205 | B1 | 8/2002 | Miller et al. |
| 2002/0137843 | A1 | 9/2002 | Kwag et al. |
| 2004/0102589 | A1 | 5/2004 | Jang et al. |
| 2005/0182213 | A1* | 8/2005 | Viola ...................... C08C 19/00 526/164 |
| 2011/0112261 | A1* | 5/2011 | Viola ...................... C08F 36/06 526/86 |

FOREIGN PATENT DOCUMENTS

| CN | 1840552 A | * 10/2006 |
| EP | 0863165 A1 | 9/1998 |
| EP | 1026181 A1 | 8/2000 |
| EP | 1431318 A1 | 6/2004 |
| EP | 1557433 A1 | 7/2005 |
| EP | 1650227 A2 | 4/2006 |
| EP | 1975200 A1 | 10/2008 |
| EP | 2260063 B1 | 12/2013 |
| WO | 9305083 A1 | 3/1993 |

OTHER PUBLICATIONS

Machine translation of CN 1840552 A, 2006.*
International Search Report dated Aug. 5, 2013 for PCT/IB2013/053230.
L. J. Bellamy, "The Infrared Spectra of Complex Molecules" (1975), vol. 1, Third Ed., Chapman and Hall).
Pavel Kratochvil, "Classical Light Scattering from Polymer Solutions" (1987), Polymer Science Library, 5, Elsevier Science Publishers B. V.
"Application Note" (1996), No. 9, Wyatt Technology.

* cited by examiner

*Primary Examiner* — Wenwen Cai
(74) *Attorney, Agent, or Firm* — Abel Law Group, LLP

(57) ABSTRACT

A process for the preparation of branched polybutadiene having a high content of 1,4-cis units which comprises polymerizing butadiene in the presence of at least one organic solvent, and in the presence of: a) a catalytic system prepared in situ including: ($a_1$) at least one neodymium carboxylate, ($a_2$) at least one alkyl compound of aluminum, ($A_3$) at least one alkyl compound of aluminum containing at least one halogen atom, and b) at least one organic ester containing at least one halogen atom. Said branched polybutadiene having a high content of 1,4-cis units, depending on the branching degree and molecular weight distribution, can be advantageously used in various applications ranging from the modification of plastic materials [production, for example, of high impact polystyrene (HIPS)] to the production of tires, in particular the production of treads and/or of sidewalls of tires.

15 Claims, No Drawings

PROCESS FOR THE PREPARATION OF BRANCHED POLYBUTADIENE HAVING A HIGH CONTENT OF 1,4-CIS UNITS

The present invention relates to a process for the preparation of branched polybutadiene having a high content of 1,4-cis units.

More specifically, the present invention relates to a process for the preparation of branched polybutadiene having a high content of 1,4-cis units, which comprises polymerizing butadiene in the presence of (a) a catalytic system prepared in situ, comprising: ($a_1$) at least one neodymium carboxylate, ($a_2$) at least one alkyl compound of aluminum, ($a_3$) at least one alkyl compound of aluminum containing at least one halogen atom; and (b) at least one organic ester containing at least one halogen atom.

Said process allows not only the branching degree of the polybutadiene having a high content of 1,4-cis units obtained to be controlled, but also the molecular weight distribution. In other terms, said process allows the preparation of branched polybutadiene having a high content of 1,4-cis units with different branching degrees and for which the polydispersity index, corresponding to the ratio between the weight average molecular weight ($M_w$) and the number average molecular weight ($M_n$) (i.e. the ratio $M_w/M_n$) can range from 1.9 to 2.5 (this relates to a narrow molecular weight distribution), or from 2.5 to 4 (this relates to a wide molecular weight distribution).

Said branched polybutadiene having a high content of 1,4-cis units, in relation to the branching degree and the molecular weight distribution (i.e. $M_w/M_n$ ratio), can be conveniently used for various applications ranging from the modification of plastic materials [production, for example, of high impact polystyrene (HIPS)], to the production of tyres, in particular the production of treads and/or of sidewalls of tyres.

The branched polybutadiene having a high content of 1,4-cis units obtained with the above process can also be conveniently used in vulcanizable elastomeric compositions.

A further object of the present invention therefore relates to a vulcanizable elastomeric composition comprising at least one branched polybutadiene having a high content of 1,4-cis units obtained with the above process.

Said elastomeric composition can be advantageously used in the production of vulcanized end-products, in particular in the production of tyres, more specifically, in the production of treads and/or of sidewalls of tyres.

For the sake of simplicity, in the following description, the term "polybutadiene(s)", when not otherwise specified, refers to polybutadiene(s) having a content of 1,4-cis unit higher than 90%.

As it is known that the rheological characteristics of polybutadienes, as also of other polymers, are a direct consequence of the molecular weight, of the molecular weight distribution (i.e. $M_w/M_n$ ratio) and of the branching degree, the possibility of having means for modifying the structure of polybutadienes on the same production plant, consequently allows a wide range of products to be obtained, whose application can vary from the modification of plastic materials [for example, production of high impact polystyrene (HIPS)] to the field of tyres.

Efforts have been made in the art for finding processes for the preparation of polybutadiene capable of controlling the branching degree and/or the molecular weight distribution (i.e. $M_w/M_n$ ratio).

In this respect, processes are known which modify polybutadienes in order to obtain polybutadienes having a low branching degree.

European patent EP 1,557,433, for example, relates to a process for the preparation of polybutadiene having a low branching degree, carried out by the polymerization of 1,3-butadiene in the presence of neodymium catalysts, said process comprising: (a) a first step for the polymerization of butadiene in the presence of organic solvents and in the presence of a catalytic system comprising ($a_1$) a neodymium derivative selected from neodymium carboxylates having a $H_2O/Nd$ molar ratio lower than 1, and a —COOH/Nd molar ratio lower than 2, ($a_2$) an aluminum alkyl having general formula $Al(R^4)_3$ (Ia) or $AlH(R^4)_3$ (Ib) wherein $R^4$, equal to or different from each other, represent an alkyl group containing from 1 to 10 carbon atoms, ($a_3$) an organo-aluminum derivative containing at least one halogen atom, preferably chlorine, said first step (a) being carried out until a butadiene conversion ≥98% is reached, to give linear polybutadiene ($g_m=1$) having a content of 1,4-cis units higher than 93%, and a $M_w/M_n$ ratio ranging from 2.2 to 2.9; (b) treatment of the polymeric solution obtained at the end of step (a) with a peroxide until polybutadiene having a low branching degree is obtained; (c) recovery of the polybutadiene having a low branching degree obtained at the end of step (b). The polybutadiene thus obtained is said to have an optimum balance between viscosity and elastic properties, which leads to a considerable improvement in its processability.

European patent EP 1,650,227 relates to a process for the preparation of polybutadiene having a low branching degree comprising the following steps: (a) polymerization of butadiene in the presence of organic solvents and in the presence of a catalytic system comprising ($a_1$) a neodymium derivative selected from neodymium carboxylates, said neodymium carboxylates being water-free and without —COOH groups, ($a_2$) an aluminum alkyl having general formula $Al(R^4)_3$ (Ia) or $AlH_n(R^4)_{3-n}$ (Ib) wherein n is a number from 1 to 2 and $R^4$, equal to or different from each other, represent an alkyl group containing from 1 to 10 carbon atoms, ($a_3$) a organo-aluminum derivative containing at least one halogen atom, preferably chlorine, said first step (a) giving linear polybutadiene ($g_m=1$) having a content of 1,4-cis units higher than 93%, a $M_w/M_n$ ratio lower than 2.5; (b) treatment of the polymeric solution obtained at the end of step (a) with a coupling agent, so as to obtain polybutadiene having a low branching degree; (c) recovery of the polybutadiene having a low branching degree obtained at the end of step (b); said process being characterized in that the coupling agent is selected from: (i) unsaturated natural oils, (ii) butadiene and/or isoprene oligomers, (iii) butadiene and/or isoprene copolymers with vinyl arene monomers; the unsaturation present in compounds (i)-(iii) being at least partially substituted by groups selected from epoxides, anhydrides and esters, preferably from epoxides and succinic anhydride. The polybutadiene thus obtained is said to have an optimum balance between viscosity and elastic properties, which leads to a considerable improvement in its processability.

The above processes create various types of branchings. Whereas the use of peroxides, in fact, tends to form branchings on all the double bonds present in the polymeric chain and to produce macroradicals, preferably on the high-molecular-weight fraction generating a long-chain branching, the use of coupling agents involves in the reaction the chain-ends still active at the end of the conversion and, as these active chain-ends are mostly present in the low-molecular-weight fractions, a branching on the part of the latter is created.

The above processes, however, can have various drawbacks.

These processes, for example, cannot be pushed beyond a certain level, otherwise insoluble fractions can be formed. In addition, two reaction steps are always required: a first polymerization step to linear polybutadiene and a second branching step of the linear polybutadiene previously obtained. As the branching degree cannot be pushed beyond a certain limit, as mentioned above, both of the above processes can therefore only be suitable for the production of polybutadienes that can be used in the tyre field, said polybutadienes having a Mooney viscosity, measured at 100° C., ranging from 40 to 50 and an absolute viscosity in styrene (5% solution), measured at 25° C., ranging from 180 cPs to 400 cPs.

Polybutadienes having these characteristics are not suitable for use in the modification of plastic materials. For this field, in fact, the polybutadienes should generally have an absolute viscosity in styrene (5% solution), measured at 25° C., ranging from 40 cPs to 180 cPs and a Mooney viscosity, measured at 100° C., higher than or equal to 35. In this way, suitable conditions are created for the preparation of high-impact polystyrene (HIPS) having a morphology which is such as to have good Izod impact strength values. Normally, polybutadienes that can be used for modifying plastic materials, optionally branched when polybutadienes having a very low viscosity in styrene are requested, are generally synthesized anionically, in continuous reactors, or in batch reactors.

When linear polybutadienes are required, said polybutadienes are generally obtained through processes using Ziegler-Natta type catalysts. Four different technologies adopting Ziegler-Natta type catalysts can be used for the production of linear polybutadienes having a high content of 1,4-cis units: titanium, cobalt, nickel and neodymium, which are the most widely-used metals for the preparation of said Ziegler-Natta catalysts. The characteristics of the polybutadienes obtained through these different technologies differ with respect to both the molecular-weight distribution (i.e. the $M_w/M_n$ ratio) and the branching degree, whereas the content of 1,4-cis units, even if modifiable, is normally maintained high, and in any case higher than 90%, by acting on the reaction conditions or on the stoichiometric ratios of the catalyst constituents, or by modifying the nature of the components of the mixture used for the preparation of the catalyst. In general, polybutadienes obtained through synthesis in the presence of catalysts based on neodymium have, upon multi-angle laser light scattering (MALLS) analysis, a $M_w/M_n$ ratio of about 3 and an essentially linear structure; polybutadienes obtained through synthesis in the presence of catalysts based on titanium have a $M_w/M_n$ ratio ranging from about 2 to about 3 and an essentially linear structure; polybutadienes obtained through synthesis in the presence of catalysts based on nickel have a $M_w/M_n$ ratio of about 4 and a low branching (generally equal to about 0.9 branches for every 1,000 carbon atoms); whereas the polybutadienes obtained through synthesis in the presence of catalysts based on cobalt have a $M_w/M_n$ ratio ranging from about 3 to about 3.5 and a relatively low branching (generally equal to about 1.7 branches-2 branches for every 1,000 carbon atoms). The use of catalysts based on cobalt therefore allows to obtain polybutadienes relatively branched and having an average molecular-weight distribution: consequently, their viscosity in solution is lower than that of polybutadienes obtained through synthesis in the presence of catalysts based on nickel, titanium or neodymium.

Also the above processes, however, can have various drawbacks. The use of catalysts based on nickel or cobalt, for example, can be problematical due to the toxicological characteristics of nickel and of cobalt and to the consequent necessity of having an extraction section of the metal from the polymeric solution obtained.

In addition, the use of catalysts based on titanium, cobalt or nickel, requires the use of aromatic solvents as the catalytic complexes that can be used for the polymerization are not soluble in aliphatic or cycloaliphatic solvents.

The necessity was therefore felt by experts in the field to have a polymerization system in which the use of a salt of a non-toxic metal soluble in aliphatic solvents could allow the preparation of a range of polybutadienes suitable for being used in both the field of tyres (from linear to moderately branched polybutadienes) and also for the modification of plastic materials.

It is known that polymerization catalysts of butadiene based on organic salts of neodymium obtained by reacting a neodymium salt with an aluminum alkyl and a chlorinating compound, are soluble in aliphatic or cycloaliphatic solvents. The polybutadienes obtained with the use of these salts generally have an essentially linear structure with a relatively wide molecular-weight distribution.

In this respect, European patent EP 1,431,318 relates to a process for the preparation of polydienes which comprises the polymerization of conjugated dienes (e.g., butadiene) in the presence of a catalytic system essentially consisting of components (a) to (d), wherein: component (a) is a compound containing a rare-earth element with an atomic number from 57 to 71 in the Periodic Table of Elements or a product obtained by reacting the above compound with a Lewis base, and is preferably a neodymium compound; component (b) is an organo-aluminum derivative containing at least one halogen atom; component (c) is an alumoxane; component (d) is an organometallic compound of aluminum having general formula $AlR_1R_2R_3$ (I) wherein $R_1$ and $R_2$, equal to or different from each other, are hydrocarbyl groups having from 1 to 10 carbon atoms, or they are hydrogen and $R_3$ is a hydrocarbyl group having from 1 to 10 carbon atoms; said process being characterized in that it is carried out under operative conditions selected from: (i) essentially isothermal conditions at a temperature ranging from 70° C. to 140° C.; (ii) essentially adiabatic conditions with an initial temperature ranging from 50° C. to 90° C. and a final temperature ranging from 100° C. to 150° C.; said process being continued under conditions (i) or (ii) until a polydiene is obtained having branching index values (measured by means of the GPC-Malls technique) lower than 0.90 and values of the parameter α (also measured by means of the GPC-Malls technique) ranging from 0.53 to 0.30. The polydienes thus obtained are said to have a content of 1,4-cis units ranging from 80% to 96% and to be branched with consequent low values of the absolute viscosities in solution [e.g., absolute viscosity in styrene (solution at 5%)], measured at 25° C., ranging from 75 cPs to 147 cPs and a Mooney viscosity, measured at 100° C., ranging from 40 to 45.

The above process, however, has various drawbacks. The preparation of the catalyst, in fact, is complex and impractical due to the use of high quantities of alumoxane.

A process which uses a catalyst based on organic salts of neodymium without alumoxane is also known.

Patent application EP 2,260,063 relates to a process for the preparation of polybutadiene characterized in that it is carried out by the polymerization of butadiene in an aliphatic and/or cycloaliphatic solvent in the presence of a catalytic system prepared in situ, comprising: (i) a neodymium carboxylate soluble in the process solvent, containing a variable amount of water, the $H_2O/Nd$ molar ratio ranging from 0.001/1 to 0.3/1, (ii) an aluminum alkyl compound, (iii) an alkyl compound of aluminum wherein at least one aluminum bond consists of aluminum-chlorine (Al—Cl) bond; the total aluminum/neodymium (total Al/Nd) molar ratio ranging from 4/1 to 12/1, and the chlorine/neodymium (Cl/Nd) molar ratio ranging from 2/1 to 6/1; and is carried out in continuous at a temperature ranging from 70° C. to 130° C. The above process is said to be capable of producing high-cis, branched polybutadienes, having a molecular-weight distribution for which the polydispersity index specified by the ratio $M_w/M_n$ can range from 1.9 to 2.5 (in this case the molecular-weight distribution index is said to be narrow), or from 2.5 to 4 (in which case the molecular weight distribution is said to be wide).

Alternative processes for allowing the production of branched polybutadienes having a high content of 1,4-cis units, different branching degrees and different molecular-weight distributions (i.e. with different $M_w/M_n$ ratios), are still of interest.

The Applicant has therefore considered the problem of finding a process for the preparation of branched polybutadiene having a high content of 1,4-cis units, different branching degrees and different molecular-weight distributions (i.e. with different $M_w/M_n$ ratios), in a single reaction step.

The Applicant has now found that the production of branched polybutadiene having a high content of 1,4-cis units, different branching degree and different molecular-weight distribution, in a single reaction step, can be advantageously carried out in the presence of: (a) a catalytic system prepared in situ, comprising: ($a_1$) at least one neodymium carboxylate, ($a_2$) at least one alkyl compound of aluminum, ($a_3$) at least one alkyl compound of aluminum containing at least one halogen atom; and (b) at least one organic ester containing at least one halogen atom. Said process therefore allows to control not only the branching degree but also the molecular-weight distribution (i.e. the $M_w/M_n$ ratio) of the obtained polybutadiene having a high content of 1,4-cis units. Furthermore, said organic ester containing at least one halogen atom can be used during the polymerization without negative effects on the same. In addition, this process allows polybutadiene to be obtained, whose application ranges from the modification of plastic materials [for example, the production of high impact polystyrene (HIPS)], to the production of tyres, in particular the production of treads and/or sidewalls of tyres.

An object of the present invention therefore relates to a process for the preparation of branched polybutadiene having a high content of 1,4-cis units which comprises polymerizing butadiene, in the presence of at least one organic solvent, and in the presence of:
a) a catalytic system prepared in situ comprising:
($a_1$) at least one neodymium carboxylate,
($a_2$) at least one alkyl compound of aluminum,
($a_3$) at least one alkyl compound of aluminum containing at least one halogen atom, and
b) at least one organic ester containing at least one halogen atom.

For the purposes of the present invention and of the following claims, the definitions of the numerical ranges always include the extremes unless otherwise specified.

According to a preferred embodiment of the present invention, said butadiene is present in an amount ranging from 5% to 40% by weight, preferably from 10% to 25% by weight, with respect to the total weight of the organic solvent. A distilled butadiene is preferably used, optionally, treated with molecular sieves and/or activated alumina. 1,3-butadiene is preferably used.

According to a preferred embodiment of the present invention, said organic solvent can be selected from: saturated aliphatic hydrocarbons such as, for example, butane, n-pentane, n-hexane, n-heptane, or mixtures thereof; saturated cycloaliphatic hydrocarbons such as, for example, cyclohexane, cyclopentane or mixtures thereof; mono-olefins such as 1-butene, 2-butene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof; or mixtures thereof. Preferably, said organic solvent can be selected from saturated aliphatic hydrocarbons, and is even more preferably n-hexane, or from saturated cycloaliphatic hydrocarbons, and is even more preferably cyclohexane. Said organic solvent, should preferably be as anhydrous as possible and free of protogenic substances. A distillation followed by treatment on alumina beds and molecular sieves 3 A or 4 A is sufficient for obtaining a suitable solvent.

According to a preferred embodiment of the present invention, said neodymium carboxylate ($a_1$) is neodymium versatate [Nd(versatate)$_3$]. Preferably, said neodymium versatate [Nd(versatate)$_3$] may have a molar ratio RCOOH/Nd lower than 2, preferably lower than 0.5.

In accordance with a preferred embodiment of the present invention, said neodymium carboxylate can be used in an amount ranging from 0.1 mmoles to 10 mmoles, preferably from 0.5 mmoles to 5 mmoles per 1,000 g of butadiene to be polymerized. It should be noted that when the amount of neodymium carboxylate is lower than 0.1 mmoles, the reaction rate is reduced to unacceptable values whereas, when the amount of neodymium carboxylate is over 10 mmoles, the catalyst concentration is excessively high and the weight average molecular weight ($M_w$) of the polymer obtained is too low for the uses mentioned above.

According to a preferred embodiment of the present invention, said alkyl compound of aluminum ($a_2$) can be selected from compounds having general formula (I) or (II):

$$Al(R)_3 \quad (I)$$

$$AlH(R)_2 \quad (II)$$

wherein R represents a linear or branched $C_1$-$C_{10}$ alkyl group.

Specific examples of alkyl compounds of aluminum having general formula (I) or (II) which can be advantageously used for the purposes of the present invention, are: trimethylaluminum, triethylaluminum (TEA), tri-n-propylaluminum, tri-isopropylaluminum, tri-n-butylaluminum, tri-isobutylaluminum, tri-pentylaluminum, tri-hexylaluminum, tri-cyclohexylaluminum, tri-octylaluminum, diethylaluminum hydride, di-n-propylaluminum hydride, di-n-butylaluminum hydride, di-isobutylaluminum hydride (DIBAH), dihexylaluminum hydride, di-isohexylaluminum hydride, or mixtures thereof. Trietylaluminum (TEA), tri-isobutylaluminum, diethylaluminum hydride, di-isobutylaluminum hydride (DIBAH), are preferred.

In accordance with a preferred embodiment of the present invention, said alkyl compound of aluminum containing at least one halogen atom ($a_3$) can be selected from compounds having general formula (III):

$$AlX_nR_{3-n} \quad (III)$$

wherein R represents a linear or branched $C_1$-$C_{10}$ alkyl group, X represents a halogen atom such as, for example, chlorine, bromine, fluorine, iodine, preferably chlorine, n is 1 or 2.

Specific examples of alkyl compounds of aluminum containing at least one halogen atom ($a_3$) which can be advantageously used for the purposes of the present invention are: diethyl aluminum chloride (DEAC), ethyl aluminum dichloride, ethyl aluminum sesquichloride (EASC), di-isobutyl-aluminum chloride (DIBAC), or mixtures thereof. Diethyl aluminum chloride (DEAC), di-isobutylaluminum chloride (DIBAC), are preferred.

According to a preferred embodiment of the present invention, the molar ratio between neodymium carboxylate ($a_1$) and the alkyl compound of aluminum ($a_2$) can range from 1/1 to 1/30, preferably from 1/1 to 1/10.

According to a preferred embodiment of the present invention, the molar ratio between the neodymium carboxylate ($a_1$) and the alkyl compound of aluminum containing at least one halogen atom ($a_3$) can range from 1/1.5 to 1/6, preferably from 1/3 to 1/5.

According to a preferred embodiment of the present invention, the compound of aluminum containing at least one halogen atom ($a_3$) is used in such an amount that the ratio between the halogen present in said compound ($a_3$) and the alkyl compound of aluminum ($a_2$) ranges from 0.5 to 5, more preferably from 0.5 to 1.5.

According to a preferred embodiment of the present invention, said organic ester containing at least one halogen atom (b) can be selected from compounds having general formula (IV):

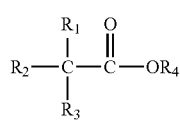

(IV)

wherein:

$R_1$, $R_2$ and $R_3$, equal to or different from each other, represent a halogen atom such as, for example, chlorine, fluorine, bromine, iodine, preferably chlorine; or they are selected from linear or branched $C_1$-$C_{10}$ alkyl groups, linear or branched $C_2$-$C_{10}$ alkenyl groups, aryl groups, cycloalkyl groups, ester groups; with the proviso that at least one of $R_1$, $R_2$ and $R_3$ is a halogen atom;

$R_4$ is selected from linear or branched $C_1$-$C_{10}$ alkyl groups, linear or branched $C_2$-$C_{10}$ alkenyl groups, aryl groups.

Specific examples of compounds containing chlorine having general formula (IV) which can be advantageously used for the purposes of the present invention, are: ethyl trichloro acetate (ETA), dichlorophenyl ethyl acetate (DCPAE), or mixtures thereof. Ethyl trichloro acetate (ETA) is preferred.

According to a preferred embodiment of the present invention, the molar ratio between the organic ester containing at least one halogen atom (b) and the neodymium carboxylate ($a_1$) can range from 1/0.00001 to 1/0.1, preferably from 1/0.0005 to 1/0.0015.

The above process can be carried out under adiabatic or isotherm conditions.

According to a preferred embodiment of the present invention, said process can be carried out at a temperature ranging from 20° C. to 120° C., preferably from 25° C. to 95° C.

According to a preferred embodiment of the present invention, said process can be carried out at a pressure ranging from 1 bar to 10 bar, preferably from 3 bar to 6 bar.

With respect to the polymerization times, these vary according to the operative conditions. As an example, during the polymerization, a complete conversion of butadiene is obtained within 60 minutes-90 minutes at a temperature of 60° C.: at higher temperatures the polymerization rate increases and the butadiene conversion is completed in shorter times, for example, within 30 minutes, at a temperature of 80° C.

The polymerization degree is generally regulated by intervening on the ratio $v=BDE/(Nd+Al/n)$. The amount of neodymium (Nd) defines the polymerization rate which generally ranges from 1 mmole/kg to 2.5 mmoles/kg of monomer (BDE—butadiene) and is selected on the basis of the prefixed operating conditions; if high polymerization rates are required, higher amounts of neodymium carboxylate ($a_1$) will be used, optionally increasing the molar ratio between the neodymium carboxylate ($a_1$) and the aluminum alkyl compound ($a_2$), maintaining the ratio between the neodymium carboxylate ($a_1$) and the alkyl compound of aluminum containing at least one halogen atom ($a_3$) within the above-mentioned range. The index n depends on the temperature and has a value of about 3 for isothermal polymerizations carried out up to 60° C., to a value of about 1 for polymerizations carried out at temperatures up to 100° C.

The process object of the present invention, can be carried out in continuous or batchwise, preferably in continuous.

When a batch reactor is used, the neodymium carboxylate ($a_1$) is generally added, in the desired amount, to the mixture consisting of the organic solvent, the monomer, the alkyl compound of aluminum ($a_2$), the alkyl compound of aluminum containing at least one halogen atom ($a_3$) and the organic ester containing at least one halogen atom (b).

Alternatively, the addition of aluminum containing at least one halogen atom ($a_3$) can be carried out as the last ingredient in the polymerization mixture composed of the organic solvent, the monomer, the neodymium carboxylate ($a_1$), the alkyl compound of aluminum ($a_2$) and the organic ester containing at least one halogen atom (b): in this case, a broadening of the molecular weight distribution is obtained, with a consequent increase in the fraction with a molecular weight $>10^6$ and, in general, a lower polymerization rate. Both of these parameters are, in any case, in relation to the contact time between the neodymium carboxylate ($a_1$) and the alkyl compound of aluminum ($a_2$) and to the temperature at which the two above-mentioned components interact.

In the process according to the present invention, the neodymium carboxylate ($a_1$) is preferably added to the reaction mixture as the last ingredient.

If a continuous reactor is used, the feeding of the neodymium carboxylate ($a_1$) is preferably carried out as close as possible to the polymerization reactor if not, even more preferably, inside the polymerization reactor itself.

At the end of the polymerization, the polybutadiene obtained is recovered by means of an operation called flash, wherein the rapid pressure decrease causes the loss, by evaporation, of the residual monomer and of part of the solvent, with a consequent increase in the concentration of the polymer in solution. The catalytic system is subsequently quenched by means of protic substances, for example, water.

The branched polybutadiene having a high content of 1,4-cis units obtained with the process object of the present invention, preferably has the following characteristics:

content of 1,4-cis units higher than or equal to 92%, preferably ranging from 95% to 99%;

Mooney viscosity ranging from 30 to 70, preferably from 35 to 65;

branching index ($g_m$) lower than 1, preferably ranging from 0.4 to 0.9;

polydispersity index $M_w/M_n$ ranging from 1.9 to 4, preferably from 2 to 3.

As mentioned above, the branched polybutadiene having a high content of 1,4-cis units obtained through the above process can be advantageously used in vulcanizable elastomeric compositions.

Said branched polybutadiene having a high content of 1,4-cis units can be used, for example, in a mixture with at least one filler such as, for example, silica and/or carbon black, as component of vulcanizable elastomeric compositions suitable for the preparation of tyres, in particular of treads and/or of sidewalls of tyres.

A further object of the present invention therefore relates to an elastomeric vulcanizable composition comprising at least one branched polybutadiene having a high content of 1,4-cis units obtained as described above, at least one filler selected from silica, carbon black, or mixtures thereof, and at least one vulcanizing agent. Preferably, said filler may be present in said elastomeric vulcanizable composition in an amount ranging from 5 phr to 500 phr.

In addition to said branched polybutadiene having a high content of 1,4-cis units, said elastomeric vulcanizable composition can comprise other elastomers such as, for example, natural rubber (NR), styrene-butadiene copolymers (SBR). It is preferable, however, for said vulcanizable elastomeric composition to include from 10% by weight to 65% by weight of said branched polybutadiene having a high content of 1,4-cis units, with respect to the total weight of the elastomers present in said vulcanizable elastomeric composition.

For the purposes of the present invention and of the following claims, the term "phr" refers to the parts by weight of a certain component per 100 parts by weight of (co)polymer(s) present in the vulcanizable elastomeric composition.

Said vulcanizing agent can be selected, for example, from soluble or insoluble elemental sulfur, or from sulfur donors or mixtures thereof.

Sulfur donors are, for example, dimorpholyl disulfide (DTDM), 2-morpholine-dithiobenzothiazole (MBSS), disulfide of caprolactame, dipentamethylenethiurame tetrasulphide (DPTT), tetramethyltiuram disulfide (TMTD), or mixtures thereof.

If the vulcanizing agent is selected from sulfur or sulfur donors, in order to increase the vulcanization yield, it can be also advantageous to use other additives, such as, for example, dithiocarbamates, thiurams, thiazoles, sulfenamides, xanthogenates, guanidine derivates, caprolactams, thiourea derivatives or mixtures thereof.

In said vulcanizable elastomeric composition, said sulfur, and/or said sulfur donors, and/or said other additives indicated above, optionally present, are normally present in an amount ranging from 0.05 phr to 10 phr, preferably from 0.1 phr to 8 phr.

Other compounds, such as, for example, organic saturated or unsaturated fatty acids, or their zinc salts; polyalcohols; amine alcohols (e.g., triethanolamine); amines (e.g., dibutylamine, dicyclohexylamine, cyclohexylethylamine); polyether amines; or mixtures thereof, can be added to the vulcanizable elastomeric compositions object of the present invention.

Vulcanization inhibitors can also be added, such as, for example, N-cyclohexyl-thiophthalimide (PVI), N,N'-dinitrosopentamethylenetetramine (DNPT), phthalic anhydride (PTA), diphenylnitrosamine, or mixtures thereof.

In addition to the above-mentioned vulcanizing agents and/or to the other compounds indicated above, the vulcanizable elastomeric composition object of the present invention, can include other additional additives normally used in elastomeric compositions and known to experts in the field such as, for example, other fillers, filler activators, ozone protection agents, aging inhibitors, antioxidants, processing aids, extender oils, plasticizers, reinforcing materials, mould releasing agents.

Other fillers which can be used for the purposes of the present invention are, for example: barium sulfate, titanium dioxide, zinc oxide, zinc carbonate, lead oxide, calcium oxide, calcium carbonate, magnesium oxide, aluminum oxide, iron oxide, aluminum hydroxide, magnesium hydroxide, aluminum silicates, diatomaceous earth, talc, kaolins, bentonites, carbon nanotubes, Teflon® (preferably in powder form), silicates, or mixtures thereof. The total amount of fillers in any case ranges from 5 phr to 500 phr.

Filler activators which can be used for the purposes of the present invention are, for example: organic silanes such as, for example, vinyl-trimethyloxysilane, vinyldimethoxymethylsilane, vinyl-triethoxysilane, vinyltris-(2-methoxyethoxy)silane, N-cyclohexyl-3-aminopropyl-trimethoxysilane, 3-amino-propyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (octadecyl)methyldimethoxysilane, or mixtures thereof. Further filler activators are, for example, surfactants such as triethanolamine, ethylenglycols or mixtures thereof. The amount of filler activators generally ranges from 0 phr to 10 phr.

A further object of the present invention also relates to a vulcanized manufactured product obtained from the vulcanization of said vulcanizable elastomeric composition. Said vulcanized manufactured product can be tyre treads or sidewalls of tyres.

Some illustrative and non-limiting examples are provided hereunder for a better understanding of the present invention and for its practical embodiment.

EXAMPLES

The following characterization and analysis techniques were used.

IR Analysis of the Microstructure (Content of 1,4-cis Units)

The method is based on the calculation of the ratio between the intensity of the bands attributable to the isomers 1,4-trans and 1,2-vinyl and the reference band (internal standard) falling at 1312 $cm^{-1}$ (more details relating to this method are described by L. J. Bellamy, "*The Infrared Spectra of Complex Molecules*" (1975), Vol. 1, Third Ed., Chapman and Hall). The content of 1,4-cis units was determined by the complement to 100. The preparation of the sample was carried out on a polybutadiene film obtained starting from a solution evaporated on a KBr window.

Mooney Viscosity

The Mooney viscosity (ML 1+4 @ 100° C.) was determined in accordance with the standard ASTM D 1646. In particular, the viscosity of the polybutadiene obtained was measured at 100° C., with a large rotor (L), by pre-heating for 1 minute and carrying out the measurement for 4 minutes.

Determination of the Molecular Masses Distribution (MWD)

The determination of the molecular masses distribution (MWD), from which the polydispersity index is also obtained (i.e. the $M_w/M_n$ ratio), was carried out according to the method normally used via SEC (GPC) in tetrahydrofuran (THF), at 25° C., using PL-MIXED A (X4) columns and determination of the molecular masses according to the universal calibration method (k=0.000457 dl/g and α=0.693).

Determination of the Weight Average Molecular Weight ($M_w$) and Measurement of the Branching Index ($g_m$) by Means of the SEC/MALLS Technique The weight average molecular weight ($M_w$) and the branching index ($g_m$) were determined according to an internal method taken from the work described in "*Application Note*" (1996), No. 9, Wyatt Technology and by Pavel Kratochvil, "*Classical Light Scattering from Polymer Solutions*" (1987), Polymer Science Library, 5, Elsevier Science Publishers B. V.

By coupling a multi-angle laser light scattering detector (MALLS) with a traditional SEC/RI elution system, the absolute measurement can be contemporaneously carried out of the weight average molecular weight ($M_w$) and of the gyration radius of the macromolecules that are separated by the chromatographic system; the amount of light scattered by a macromolecular species in solution can in fact be used directly for obtaining its weight average molecular weight ($M_w$), whereas the angular variation in the scattering is directly correlated with its average dimensions. The fundamental relation (1) which is used is the following:

$$\frac{K*c}{R_\theta} = \frac{1}{M_w P_\theta} + 2A_2 c \qquad (1)$$

wherein:
K*=optical constant which depends on the wave-length of the light used, on the refraction index (dn/dc) of the polymer, on the solvent used;
$M_w$=weight average molecular weight;
c=concentration of the polymeric solution;
$R_\theta$=intensity of the light scattered measured at an angle θ;
$P_\theta$=function describing the variation of the light scattered with the angle at which it is measured, equal to 1 for angle θ=0.

For very low concentrations (typical of a GPC system), the above fundamental relation (1) is reduced to the fundamental relation (2):

$$\frac{K*c}{R_\theta} = \frac{1}{M_w P_\theta} \qquad (2)$$

and by carrying out the measurement on several angles, the extrapolation to angle null of the function $K*c/R_\theta$ in relation to $sen^2\theta/2$ directly provides the weight average molecular weight ($M_w$) from the intercept value and the gyration radius from the slope.

Furthermore, as this measurement is carried out for every slice of the chromatogram, it is possible to obtain a distribution of both the weight average molecular weight ($M_w$) and the gyration radius.

The macromolecular dimensions in solution are directly correlated to their branching degree: for the same weight average molecular weight ($M_w$), the smaller the dimensions of the macromolecule with respect to the linear correspondent, the higher the branching degree will be.

Informations relating to the macrostructure of the polymer is deduced in two ways:

(1) qualitatively, from the value of the parameter α, which represents the slope of the curve which correlates the gyration radius with the weight average molecular weight ($M_w$): when, under the same analysis conditions, this value decreases with respect to a macrostructure of the linear type, there is the presence of a polymer having a branched-type macrostructure and the typical value for polybutadiene having a high content of 1,4-cis units, in tetrahydrofuran (THF), is equal to 0.58-0.60;

(2) quantitatively, by estimating the branching index ($g_m$) which is defined for each macromolecule as a ratio between the average square gyration radius of the branched macromolecule ($<r_2>_b$) and the average square gyration radius of the linear macromolecule ($<r_2>_l$), with the same molecular weight represented by the following equation (3) ($M_i$ represents the weight average molecular weight ($M_w$) of the " . . . th" molecule)

$$g_{M_i} = \left[\frac{\langle r_2 \rangle_b}{\langle r_2 \rangle_l}\right]_{M_i}. \qquad (3)$$

The branching index ($g_m$) represents the average of the above ratio along the molecular mass distribution and ranges from 0 to 1.

Example 1

Preparation of Branched Polybutadiene Having a High Content of 1,4-cis Units 584 g of cyclohexane (d=0.78 g/ml), 68 g of 1,3-butadiene (BDE) (of Versalis spa), 0.1 ml (0.0325 mg-0.00017 mmoles) of a solution of ethyl trichloro acetate (ETA) (of VIO Chemicals) in cyclohexane 0.0014 M, 1.2 ml (145.06 mg-1.02 mmoles) of a solution of di-isobutylaluminum hydride (DIBAH) (of Akzo Nobel) in cyclohexane 0.12 M, 0.51 ml (61.49 mg-0.51 mmoles) of a solution of diethyl-aluminum chloride (DEAC) (purity degree of 98.5%; molar ratio Al/Cl: 1; of Albemarle) in cyclohexane 1 M, were charged into a 1.5 l reactor, equipped with a stirrer: the reactor was heated until it reached a temperature of 60° C. 0.4 ml (0.17 mmoles) of a solution of neodymium versatate [Nd(versatate)$_3$] having a molar ratio RCOOH/Nd equal to 0.3 (of Rhodia) in cyclohexane 0.6 M (molar ratios: DEAC/Nd=3, DIBAH/Nd=6, ETA/Nd=0.001), were then added.

After 90 minutes, the polymerization reaction was considered complete and was interrupted: a conversion equal to 94% was measured. The polymeric solution was extracted from the reactor and a phenolic antioxidant was added (Irganox® 1520 of Ciba in an amount equal to 0.06% by weight with respect to the total weight of the polymer obtained). The polymeric solution obtained was subsequently fed to a recipient containing boiling water by the introduction of vapour and subjected to stirring thus eliminating the reaction solvent and obtaining a clot. Said clot was previously passed in a cold calendar and subsequently completely dried in a roll calendar at 80° C.

The polybutadiene obtained was subjected to the characterizations indicated above, obtaining the following results:

content of 1,4-cis units equal to 96%;
Mooney viscosity (ML 1+4 @ 100° C.) equal to 40;
branching index ($g_m$) equal to 0.6;
polydispersion index ($M_w/M_n$ ratio) equal to 2.5.

The invention claimed is:

1. A process for the preparation of branched polybutadiene having a high content of 1,4-cis units, by the polymerization of butadiene in the presence of at least one organic solvent, and in the presence of:
   a) a catalytic system prepared in situ including:
      ($a_1$) at least one neodymium carboxylate,
      ($a_2$) at least one alkyl compound of aluminum,
      ($a_3$) at least one alkyl compound of aluminum containing at least one halogen atom, and
   b) at least one organic ester containing at least one halogen atom,
   wherein the molar ratio between the at least one organic ester containing at least one halogen atom (b) and the at least one neodymium carboxylate ($a_1$) ranges from 1/0.0005 to 1/0.0015, wherein said polymerization of said butadiene is carried out in a single reaction step and said at least one organic ester containing at least one halogen atom is directly added to the polymerization.

2. The process for the preparation of branched polybutadiene having a high content of 1,4-cis units according to claim 1, wherein said butadiene is present in an amount ranging from 5% to 40% by weight with respect to the total weight of the at least one organic solvent.

3. The process for the preparation of branched polybutadiene having a high content of 1,4-cis units according to claim 1, wherein the at least one organic solvent is selected from: saturated aliphatic hydrocarbons; saturated cycloaliphatic hydrocarbons; mono-olefins; halogenated hydrocarbons; or mixtures thereof.

4. The process for the preparation of branched polybutadiene having a high content of 1,4-cis units according to claim 1, wherein the at least one neodymium carboxylate ($a_1$) is neodymium versatate [Nd(versatate)$_3$].

5. The process for the preparation of branched polybutadiene having a high content of 1,4-cis units according to claim 1, wherein the at least one neodymium carboxylate is used in an amount ranging from 0.1 mmoles to 10 mmoles per 1000 g of butadiene to be polymerized.

6. The process for the preparation of branched polybutadiene having a high content of 1,4-cis units according to claim 1, wherein the at least one alkyl compound of aluminum ($a_2$) is selected from compounds having general formula (I) or (II):

wherein R represents a linear or branched $C_1$-$C_{10}$ alkyl group.

7. The process for the preparation of branched polybutadiene having a high content of 1,4-cis units according to claim 1, wherein the at least one alkyl compound of aluminum containing at least one halogen atom ($a_3$) is selected from compounds having general formula (III):

wherein R represents a linear or branched $C_1$-$C_{10}$ alkyl group, X represents a halogen atom selected from chlorine, bromine, fluorine or iodine, n is 1 or 2.

8. The process for the preparation of branched polybutadiene having a high content of 1,4-cis units according to claim 1, wherein the molar ratio between the at least one neodymium carboxylate ($a_1$) and the at least one alkyl compound of aluminum ($a_2$) ranges from 1/1 to 1/30.

9. The process for the preparation of branched polybutadiene having a high content of 1,4-cis units according to claim 1, wherein the molar ratio between the at least one neodymium carboxylate ($a_1$) and the at least one alkyl compound of aluminum containing at least one halogen atom ($a_3$) ranges from 1/1.5 to 1/6.

10. The process for the preparation of branched polybutadiene having a high content of 1,4-cis units according to claim 1, wherein the at least one alkyl compound of aluminum containing at least one halogen atom ($a_3$) is used in such an amount that the ratio between the halogen present in said compound ($a_3$) and the at least one alkyl compound of aluminum ($a_2$) ranges from 0.5 to 5.

11. The process for the preparation of branched polybutadiene having a high content of 1,4-cis units according to claim 1, wherein the at least one organic ester containing at least one halogen atom (b) is selected from compounds having general formula (IV):

wherein:
   $R_1$, $R_2$ and $R_3$, equal to or different from each other, represent a halogen atom selected from chlorine, bromine, fluorine or iodine; linear or branched $C_1$-$C_{10}$ alkyl groups, linear or branched $C_2$-$C_{10}$ alkenyl groups, aryl groups, cycloalkyl groups, or ester groups; with the proviso that at least one of $R_1$, $R_2$ and $R_3$ is a halogen atom;
   $R_4$ is selected from linear or branched $C_1$-$C_{10}$ alkyl groups, linear or branched $C_2$-$C_{10}$ alkenyl groups, or aryl groups.

12. The process for the preparation of branched polybutadiene having a high content of 1,4-cis units according to claim 1, wherein said process is carried out at a temperature ranging from 20° C. to 120° C.

13. The process for the preparation of branched polybutadiene having a high content of 1,4-cis units according to claim 1, wherein said process is carried out at a pressure ranging from 1 bar to 10 bar.

14. The process for the preparation of branched polybutadiene having a high content of 1,4-cis units according to claim 3, wherein said saturated aliphatic hydrocarbons are selected from butane, n-pentane, n-hexane, n-heptane, or mixtures thereof; said saturated cycloaliphatic hydrocarbons are selected from cyclohexane, cyclopentane, or mixtures thereof; said mono-olefins are selected from 1-butene, 2-butene, or mixtures thereof; and said halogenated hydrocarbons are selected from methylene chloride, chloroform, carbon tetrachloride, trichloroethylene, perchloroethylene, 1,2-dichloroethane, chlorobenzene, bromobenzene, chlorotoluene, or mixtures thereof.

15. A process for the preparation of branched polybutadiene having a high content of 1,4-cis units, by polymerizing butadiene in the presence of at least one organic solvent, and in the presence of:

a) a catalytic system prepared in situ including:
   ($a_1$) at least one neodymium carboxylate,
   ($a_2$) at least one alkyl compound of aluminum, and
   ($a_3$) at least one alkyl compound of aluminum containing at least one halogen atom, and
b) at least one organic ester containing at least one halogen atom,
wherein the molar ratio between the at least one organic ester containing at least one halogen atom (b) and the at least one neodymium carboxylate ($a_1$) ranges from 1/0.0005 to 1/0.0015, wherein said polymerizing of said butadiene is carried out in a single reaction step immediately followed by recovery of the branched polybutadiene having a high content of 1,4-cis units.

* * * * *